(12) United States Patent
Tsushima et al.

(10) Patent No.: US 7,390,055 B2
(45) Date of Patent: Jun. 24, 2008

(54) ENGINE HOOD FOR AUTOMOBILES (75) Inventors: Kenji Tsushima, Yokohama (JP); Yutaka Mekuchi, Yokohama (JP); Masaki Kuno, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 101 days.

(21) Appl. No.: 11/079,386

(22) Filed: Mar. 15, 2005

(65) Prior Publication Data

US 2005/0212331 A1 Sep. 29, 2005

(30) Foreign Application Priority Data

Mar. 23, 2004 (JP) ............... 2004-085058

(51) Int. Cl.
*B60R 27/00* (2006.01)

(52) U.S. Cl. .................................. 296/193.11
(58) Field of Classification Search ............ 296/193.11, 296/187.03, 187.04, 193.09, 193.01, 1.03, 296/76

See application file for complete search history.

(56) References Cited

U.S. PATENT DOCUMENTS

| 2,941,759 | A | * | 6/1960 | Schwartz et al. | 244/117 A |
|---|---|---|---|---|---|
| 3,999,699 | A | * | 12/1976 | Chisholm | 228/173.5 |
| 4,130,233 | A | * | 12/1978 | Chisholm | 228/126 |
| 4,191,011 | A | * | 3/1980 | Sweeney et al. | 60/796 |
| 4,751,962 | A | * | 6/1988 | Havekost et al. | 165/300 |
| 4,768,700 | A | * | 9/1988 | Chen | 228/159 |
| 5,115,878 | A | * | 5/1992 | Hayata | 180/69.21 |
| 5,195,243 | A | * | 3/1993 | Junod | 29/897.32 |
| 5,744,763 | A | * | 4/1998 | Iwasa et al. | 181/286 |
| 5,806,619 | A | * | 9/1998 | Kleinhoffer et al. | 180/69.2 |
| 6,179,364 | B1 | * | 1/2001 | Takahashi | 296/76 |
| 6,305,494 | B1 | * | 10/2001 | Pfaffelhuber et al. | 181/286 |
| 6,883,627 | B1 | * | 4/2005 | Staines et al. | 180/69.2 |
| 7,143,514 | B2 | * | 12/2006 | Kamada et al. | 29/897.2 |
| 7,150,496 | B2 | * | 12/2006 | Fujimoto | 296/187.04 |
| 2005/0082875 | A1 | * | 4/2005 | Ikeda et al. | 296/193.11 |

FOREIGN PATENT DOCUMENTS

| JP | 2000-203378 A | 7/2000 |
|---|---|---|
| JP | 2003-054449 A | 2/2003 |
| JP | 2003-205866 A | 7/2003 |
| JP | 2003-252246 A | 9/2003 |
| JP | 2003-261070 A | 9/2003 |

* cited by examiner

*Primary Examiner*—H Gutman
(74) *Attorney, Agent, or Firm*—Foley & Lardner LLP

(57) ABSTRACT

An engine hood structure including a hood panel, and a porous metal layer disposed on an inside of the hood panel. The porous metal layer has a density increased in a direction extending from an outer periphery of the engine hood structure toward a central portion of the engine hood structure. The porous metal layer is constructed such that a plateau stress generated in the porous metal layer upon a compression test is increased in a direction extending from an outer periphery of the engine hood structure toward a central portion of the engine hood structure.

33 Claims, 7 Drawing Sheets

ENGINE HOOD FOR AUTOMOBILES

BACKGROUND OF THE INVENTION

The present invention relates to an engine hood structure for automobiles, and specifically, relates to an engine hood structure for automobiles which has necessary tensile rigidity, bending rigidity and torsional rigidity, an engine noise absorbing characteristic and an excellent impact absorbing characteristic.

An engine hood for automobiles includes an hood outer panel and an hood inner panel constituted of a plurality of beam members in order to provide necessary tensile rigidity, bending rigidity and torsional rigidity. A steel plate has been conventionally used as a material for an automobile engine hood. Recently, aluminum alloy plates, such as Japanese Industrial Standard (JIS) 5000 series, 6000 series and 7000 series, are frequently used from a viewpoint of reduction in weight of the engine hood.

Further, the engine hood for automobiles has a sound insulator for reducing noise generated from the engine, which is attached to the hood inner panel. However, it is required to minimize a height of the engine hood. Therefore, there is a demand to provide an insulator having a reduced thickness and an excellent sound absorbing characteristic.

Further, if there occurs a collision of an automobile with a pedestrian, the pedestrian is lifted up such that the head or shoulder of the pedestrian will be hit against the hood outer panel of the engine hood. Therefore, in the engine hood for automobiles, it is required to ensure a characteristic of protecting the head or shoulder of the pedestrian upon the occurrence of collision. In order to improve the pedestrian protecting characteristic, there have been proposed technologies including an arrangement of an impact absorbing member that is made of a synthetic resin material and disposed between an engine hood and a chassis component within an engine compartment. Japanese Patent Application First Publication No. 2000-203378 describes such an arrangement of an impact absorbing member. Further, Japanese Patent Application First Publication No. 2003-054449 describes a hood inner panel having a plurality of projections and an irregular shape part formed on an outer surface of each of the projections. The irregular shape part is adapted to allow deformation of the outer surface of the projection when a load is applied to the projection. Further, Japanese Patent Application First Publication No. 2003-205866 describes an hood inner panel having corrugated beads and convex shaped portions. Japanese Patent Application First Publication Nos. 2003-252246 and 2003-261070 describe a reinforced panel structure. Further, there have been proposed a technology of developing an air bag onto an engine hood upon detecting a collision by means of a sensor mounted to a vehicle, and a technology of lifting up an engine hood to increase a space between the engine hood and an engine compartment and thereby prevent parts or members accommodated in the engine compartment from coming out from the engine compartment.

SUMMARY OF THE INVENTION

In order to improve the pedestrian protecting characteristic, it will be planned to increase a deformation amount of an engine hood while reducing strength thereof to thereby absorb an impact energy applied to the engine hood. In such a case, a large space between the engine hood and parts or members accommodated in an engine compartment must be ensured. However, as explained above, recently, it has been demanded to limit the height of the engine hood to a minimum from the viewpoint of molding the automobile.

It is an object of the present invention to provide an engine hood structure having necessary tensile rigidity, bending rigidity and torsional rigidity without using a complicated and expensive structure such as an air bag and an engine hood lifting device, and capable of effectively absorbing an engine noise and effectively absorbing an impact energy applied to the engine hood to thereby reduce the impact, and capable of reducing a space between the engine hood and parts or members accommodated in an engine compartment to thereby improve freedom of molding an automobile.

In one aspect of the present invention, there is provided an engine hood structure, comprising:
 a hood panel; and
 a porous metal layer disposed on an inside of the hood panel.

In a further aspect of the present invention, there is provided an engine hood structure, comprising:
 a hood outer panel;
 a hood inner panel disposed on an inner surface of the hood outer panel; and
 a porous metal layer disposed between the hood outer panel and the hood inner panel.

In a still further aspect of the present invention, there is provided an engine hood structure, comprising:
 a first hood panel; and
 a porous metal layer disposed on an inside of the first hood panel.

DETAILED DESCRIPTION OF THE INVENTION

Figure 1:
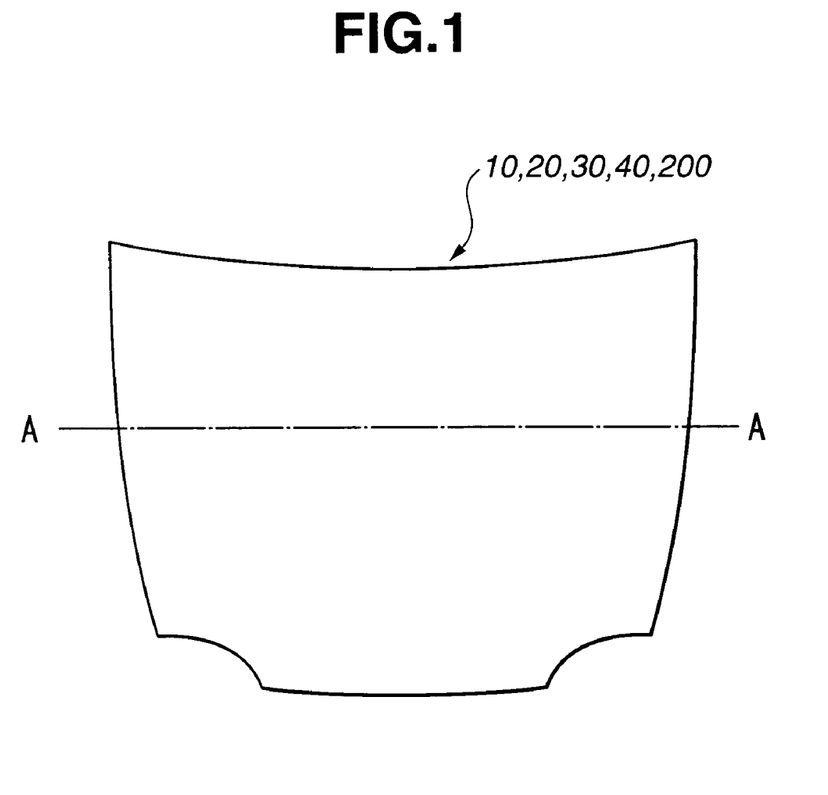
FIG. 1 is a plan view of an engine hood structure according to the present invention.

In the followings, embodiments of the present invention will be described with reference to the accompanying drawings. In the description, percentage "%" means mass percentage unless otherwise specified. FIG. 1 illustrates a top plan view of an engine hood structure according to the present invention, of first to fifth embodiments.

Figure 2:
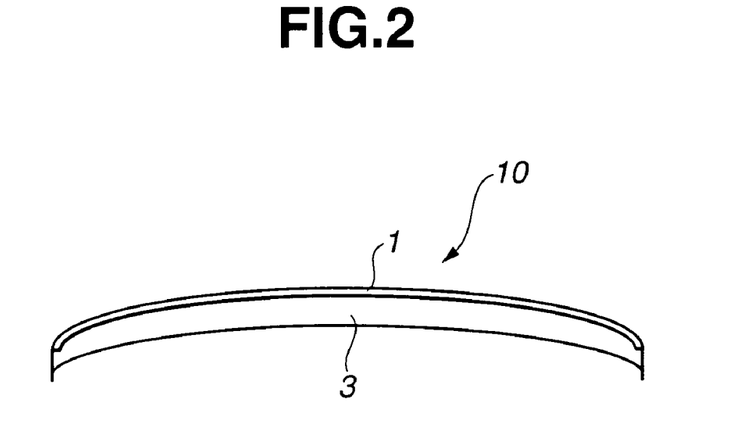
FIG. 2 is a schematic cross-sectional view of the engine hood structure, taken along line A-A shown in FIG. 1, showing a first embodiment.

Referring to FIG. 2, the engine hood structure of the first embodiment is explained. FIG. 2 shows a cross section, taken along line A-A of FIG. 1, of engine hood structure 10 of the first embodiment. Engine hood structure 10 includes hood panel 1 and porous metal layer 3 disposed on an inside of hood panel 1. Specifically, porous metal layer 3 is disposed on an inner surface of hood panel 1. Porous metal layer 3 is shaped into a generally flat plate extending along an entire inner surface of hood panel 1, and has a generally planar inner surface without a recessed or projecting portion. Porous metal layer 3 may act as a hood inner panel or an insulator. Hood panel 1 may be made of a steel plate or an aluminum alloy plate, such as JIS 5000 series, 6000 series and 7000 series. Porous metal layer 3 may be attached to the inner surface of hood panel 1 using an acrylic-based or urethane-based structural adhesive, or a urethane-based or epoxy-based foam resin material.

Figure 3:
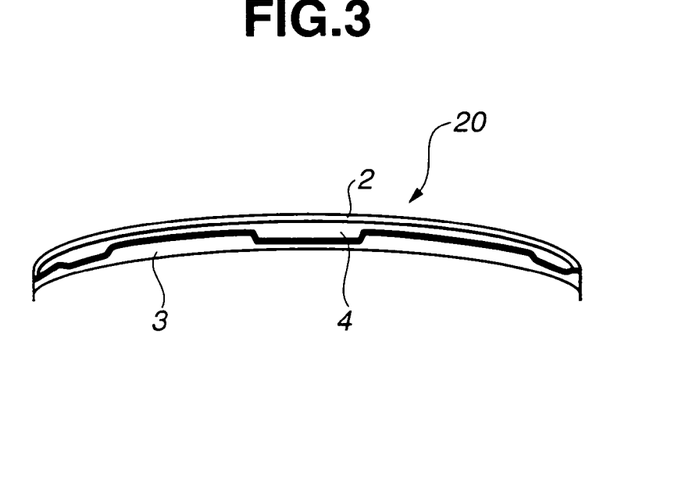
FIG. 3 is a view similar to FIG. 2, but showing a second embodiment.

Referring to FIG. 3, the engine hood structure of the second embodiment is explained. FIG. 3 shows a cross section, taken along line A-A of FIG. 1, of engine hood structure 20 of the second embodiment. Engine hood structure 20 includes hood outer panel 2, hood inner panel 4 disposed on an inner surface of hood outer panel 2, and porous metal layer 3 disposed on an inner surface of hood inner panel 4. Porous metal layer 3 is located closest to an engine body. At least one of hood outer panel 2 and hood inner panel 4 is made of at least one material selected from the group consisting of steel and aluminum alloy. Hood inner panel 4 is attached to the inner surface of hood outer panel 2 by means of a metal sealer, and further connected thereto by hemming. Hood inner panel 4 may be in the form of a pressed plate having an irregular shape having recessed portions and projecting portions. Porous metal layer 3 is attached to the inner surface of hood inner panel 4 by using an acrylic-based or urethane-based structural adhesive, or a urethane-based or epoxy-based foam resin material. Porous metal layer 3 is shaped into a generally flat plate extending along substantially the entire inner surfaces of hood outer panel 2 and hood inner panel 4, and has a generally planar inner surface. Porous metal layer 3 can act as an insulator.

Figure 4:
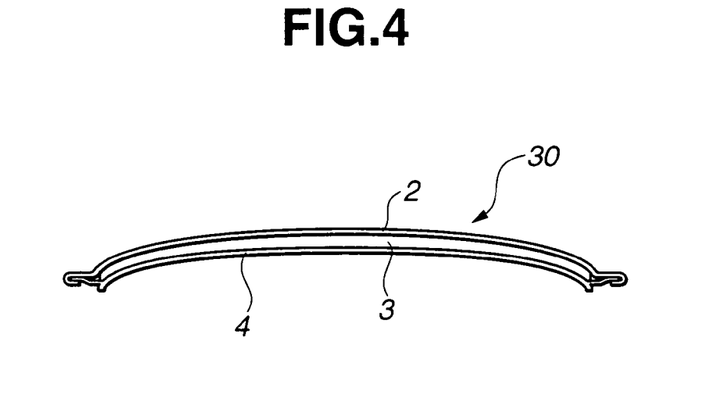
FIG. 4 is a view similar to FIG. 2, but showing a third embodiment.

Referring to FIG. 4, the engine hood structure of the third embodiment is explained. FIG. 4 shows a cross section, taken along line A-A of FIG. 1, of engine hood structure 30 of the third embodiment. Engine hood structure 30 includes hood outer panel 2, hood inner panel 4 and porous metal layer 3 disposed in a space between hood outer panel 2 and hood inner panel 3. Hood inner panel 4 is connected to an inner surface of hood outer panel 2 by hemming. Porous metal layer 3 and hood inner panel 4 are shaped into a generally flat plate extending along substantially the entire inner surface of hood outer panel 2. Hood inner panel 4 has a generally planar inner surface without a recessed or projecting portion. It is preferred that at least one of hood outer panel 2 and hood inner panel 4 are made of at least one material selected from the group consisting of steel and aluminum alloy. Porous metal layer 3 may be attached to one of the inner surface of hood outer panel 2 and an outer surface of hood inner panel 4, or both thereof by using an acrylic-based or urethane-based structural adhesive or a urethane-based or epoxy-based foam resin material. Otherwise, porous metal layer 3 may be fixedly supported between hood outer panel 2 or hood inner panel 4 without being adhered thereto.

The above-described engine hood structures 10, 20 and 30 of the first to third embodiments have improved tensile rigidity, bending rigidity and torsional rigidity, as compared to the conventional engine hood structure. In the conventional engine hood structures, in a case where the rigidity of the engine hood structures is increased, the impact absorbing characteristic thereof upon application of an impact load will be deteriorated. In contrast, with the arrangement of porous metal layer 3, engine hood structures 10, 20 and 30 of the first to third embodiments can uniformly disperse or distribute deformation caused to an impact load applied thereto, and porous metal layer 3 can be therefore deformed with less stress to thereby absorb the impact energy. This results in increasing an impact absorbing characteristic of engine hood structures 10, 20 and 30. Particularly, if any objects impact against engine hood structure 30 from the outside, porous metal layer 3 can be uniformly deformed between hood outer panel 2 and hood inner panel 4. Therefore, engine hood structure 30 can exhibit an excellent impact absorbing characteristic as a whole to thereby prevent undesired contact with the engine body. Furthermore, engine hood structures 10, 20 and 30 of the first to third embodiments can exhibit a good noise reduction characteristic.

Figure 5:
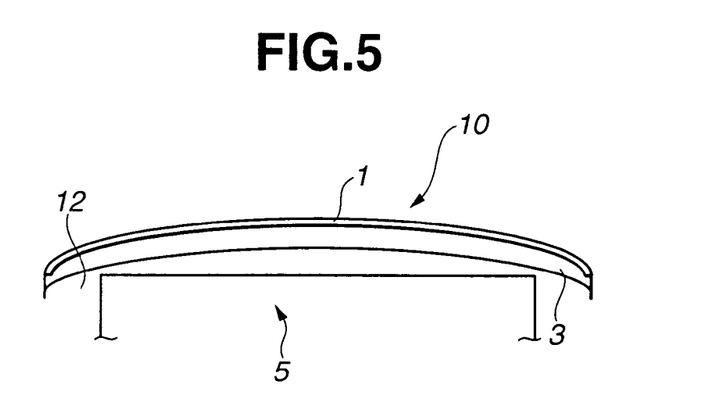
FIG. 5 illustrates a layout of the engine hood structure relative to an engine.

Preferably, the engine hood structure of the present invention includes the porous metal layer or the hood inner panel which has a generally flat plate shape as explained in the first and third embodiments shown in FIGS. 2-4. The reason therefor is as follows. In order to realize an excellent impact absorbing characteristic of the engine hood structure by compressive deformation of the porous metal layer, it is effective to uniformly compress the volume of the porous metal layer to a largest extent. In such a case where at least one of the porous metal layer and the hood inner panel has the generally flat plate shape, the engine hood structure can be arranged as shown in FIG. 5. As illustrated in FIG. 5, engine hood structure 10 of the first embodiment is disposed over engine body 5 within engine compartment 12. In this layout, engine hood structure 10 can exhibit a uniform rigidity and an excellent impact absorbing characteristic relative to the entire engine body 5. Engine hood structures 20 and 30 of the second and third embodiments can be arranged similarly to engine hood structure 10 of the first embodiment. In the second embodiment shown in FIG. 3, hood inner panel 4 has the recessed and projecting portions, but porous metal layer 3 attached to hood inner panel 4 has the generally planar inner surface so that engine hood structure 20 also can be arranged over engine body 5 within engine compartment 12.

Figure 14:
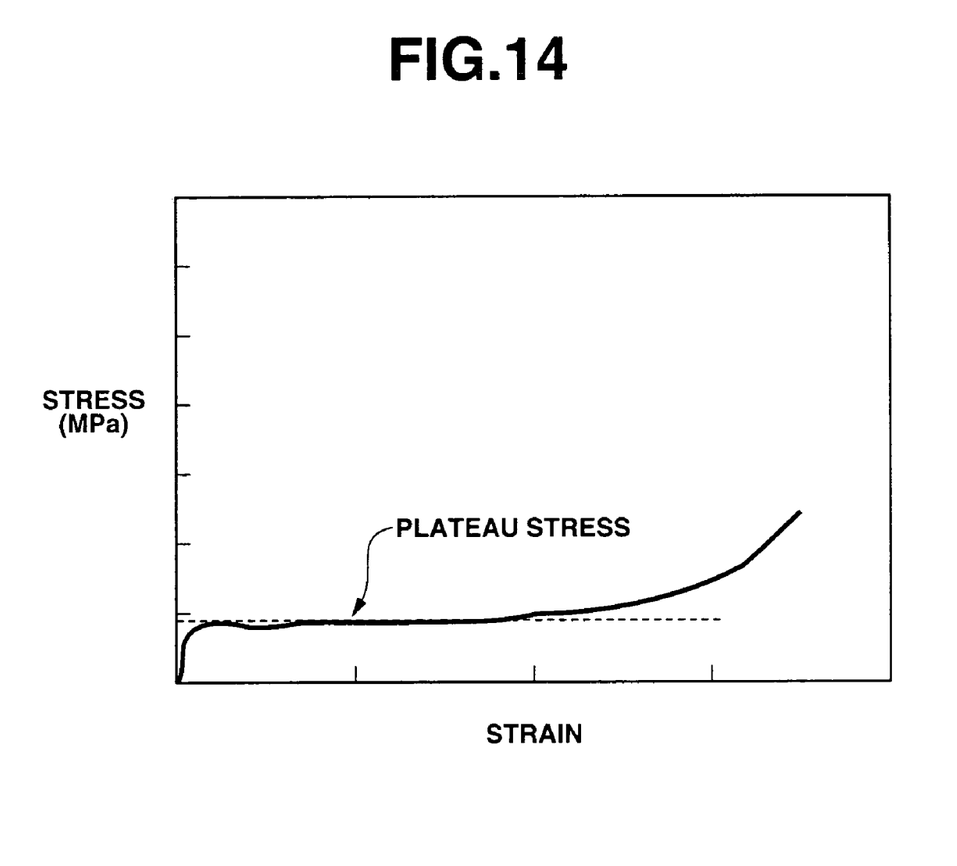
FIG. 14 is an explanatory diagram of plateau stress.

Preferably, the porous metal layer of the engine hood structure of the present invention may be made of at least one material selected from the group consisting of aluminum foam and porous aluminum. The aluminum foam may be formed by blending a foaming agent with aluminum. The porous aluminum may be formed by sintering hollow and fine aluminum particles. The porous metal layer made of the above material can be more enhanced in mechanical property. In other words, a relatively low plateau stress can be obtained at a reduced cost. Here, the term "plateau stress" means such a stress value at which deformation proceeds while substantially being kept constant without increase upon a compression test as shown in FIG. 14.

Further, from a viewpoint of a sound absorbing characteristic, it is preferred that the porous metal layer of the engine hood structure of the present invention is made of a porous metal having an open cell structure in which a plurality of cells formed in the porous metal layer are communicated with one another. In this case, noise transferred from an engine to the engine hood structure enters openings of the cells and passes through pores thereof to thereby suppress transmission of the noise. Accordingly, the engine hood structure of the present invention can exhibit excellent sound absorbing characteristic as compared to the conventional engine hood structures.

Further, it is preferred that the cells in the porous metal layer of the engine hood structure of the present invention have an average diameter of 2-4 mm. In this case, tensile rigidity, bending rigidity and torsional rigidity of the engine hood structure can be more enhanced, and noise absorbing characteristic and impact absorbing characteristic thereof can be more increased.

Further, it is preferred that the porous metal layer of the engine hood structure of the present invention has a thickness of 2-40 mm. In this case, excellent sound absorbing effect, rigidity and impact absorbing characteristic of the engine hood structure can be obtained. If the thickness of the porous metal layer is less than 2 mm, the rigidity and the impact absorbing characteristic of the engine hood structure will be hardly enhanced and the sound absorbing effect tends to be deteriorated. If the thickness of the porous metal layer is more than 40 mm, a thickness of the engine hood structure will be too large. This results in failure to ensure a sufficient amount of deformation of the engine hood structure which is caused upon impact of any objects against the engine hood structure. Otherwise, this causes interference between the engine hood structure and parts or members accommodated in an engine compartment.

Further, a density of the porous metal layer of the engine hood structure of the present invention is continuously or stepwise increased in a direction extending from an outer periphery of the engine hood structure toward a central portion thereof. The engine hood structure for automobiles is connected to an automobile body at three portions, namely, two hinges and one hood lock. In this connected condition, the outer periphery of the engine hood structure is more difficult to deform than the central portion thereof. Therefore, with the provision of the above-described density gradient of the porous metal layer, the rigidity of the engine hood structure can be kept more uniform. Further, even when objects impact against the engine hood structure from the outside to cause contact of the engine hood structure with the engine body, the contact pressure can be reduced to a minimum by compressive deformation of the porous metal layer. Here, the term "central portion" of the engine hood structure is used as a portion most distant from the outer periphery of the engine hood structure or a vicinity of the most distant portion. However, the central portion of the engine hood structure may be displaced in accordance with a shape of the engine hood structure, the connecting portions or a layout of the engine body.

Figure 6:
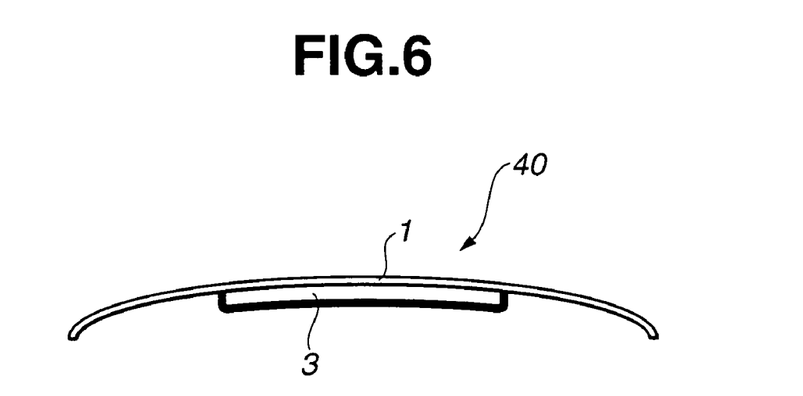
FIG. 6 is a view similar to FIG. 2, but showing a fourth embodiment.

Further, it is preferred that the density of the porous metal layer of the engine hood structure of the present invention has a maximum of 0.1-0.6 $g/cm^3$ at the central portion of the engine hood structure. In this case, porous metal layer 3 is arranged only at the central portion of engine hood structure 40 of a fourth embodiment as illustrated in FIG. 6. As a result, engine hood structure 40 of the fourth embodiment has more uniform rigidity and better impact absorbing characteristic, as compared to the conventional engine hood structures. If the density of the porous metal layer is less than 0.1 $g/cm^3$, the rigidity and the impact absorbing characteristic of the engine hood structure can be hardly enhanced. If the density of the porous metal layer is more than 0.6 $g/cm^3$, a weight of the engine hood structure will be increased and the rigidity will become too large to thereby cause deterioration of the impact absorbing characteristic.

Further, from the same viewpoint as explained above, if the engine hood structure of the present invention is adopted for automobiles, it is preferred that the porous metal layer includes at least a portion extending over an engine body so as to cover the engine body, and a density of the portion of the porous metal layer is higher than a density of a remainder portion of the porous metal layer. Specifically, the higher density portion is located opposed to the engine body within an engine compartment. Namely, the higher density portion is located above and over the engine body as viewed in a plan view of the automobile. The porous metal layer may be composed of only the higher density portion opposed to the engine body. In such a case, the engine hood structure has the porous metal layer only in an upper area of an engine compartment which is opposed to and aligned with the engine body, but has no porous metal layer in the remainder area of the engine compartment which is out of alignment with the engine body. Further, preferably, the density of the higher density portion of the porous metal layer is in a range of 0.1-0.6 $g/cm^3$.

Further, preferably, the porous metal layer of the engine hood structure of the present invention is constructed such that a plateau stress generated in the porous metal layer upon a compression test is continuously or stepwise increased in a direction extending from an outer periphery of the engine hood structure toward a central portion of the engine hood structure. The engine hood structure for automobiles is connected to an automobile body at the three portions as explained above, whereby the outer periphery of the engine hood structure is more difficult to deform than the central portion thereof. Therefore, with the provision of the above-described gradient of the plateau stress in the porous metal layer, the rigidity of the engine hood structure can be kept more uniform.

Further, it is preferred that the plateau stress generated in the porous metal layer has a maximum of 1-20 MPa at the central portion of the engine hood structure. In this case, the porous metal layer may be arranged only at the central portion of engine hood structure 40 as illustrated in FIG. 6. As a result, engine hood structure 40 has more uniform rigidity and better impact absorbing characteristic, as compared to the conventional engine hood structures. Further, even when any objects impact against the engine hood structure from the outside to cause contact of the engine hood structure with the engine body, the contact pressure can be reduced to a minimum by compressive deformation of the porous metal layer. If the plateau stress generated in the porous metal layer is less than 1 MPa, the rigidity and the impact absorbing characteristic of the engine hood structure can be hardly enhanced. If the plateau stress generated in the porous metal layer is more than 20 MPa, a weight of the engine hood structure will be increased and the rigidity will become too large to thereby cause deterioration of the impact absorbing characteristic.

Furthermore, from the same viewpoint as explained above, if the engine hood structure of the present invention is adopted for automobiles, it is preferred that the porous metal layer includes at least a portion extending over an engine body so as to cover the engine body, and a plateau stress generated in the portion of the porous metal layer upon a compression test is higher than a plateau stress generated in a remainder portion of the porous metal layer upon the compression test. Specifically, the higher-plateau stress portion is located opposed to the engine body, namely, located above and over the engine body within an engine compartment as viewed in a plan view of the automobile. The porous metal layer may be composed of only the higher-plateau stress portion opposed to the engine body. In such a case, the engine hood structure has the porous metal layer only in an upper area of an engine compartment which is opposed to and aligned with the engine body, but has no porous metal layer in the remainder area of the engine compartment which is out of alignment with the engine body. Further, preferably, the plateau stress generated in the higher-plateau stress portion opposed to the engine body is 1-20 MPa.

EXAMPLES

The present invention is described in more detail by way of examples by referring to the accompanying drawings. However, these examples are only illustrative and not intended to limit a scope of the present invention thereto.

Examples 1-6 and Comparative Examples 1-4

Figure 7:
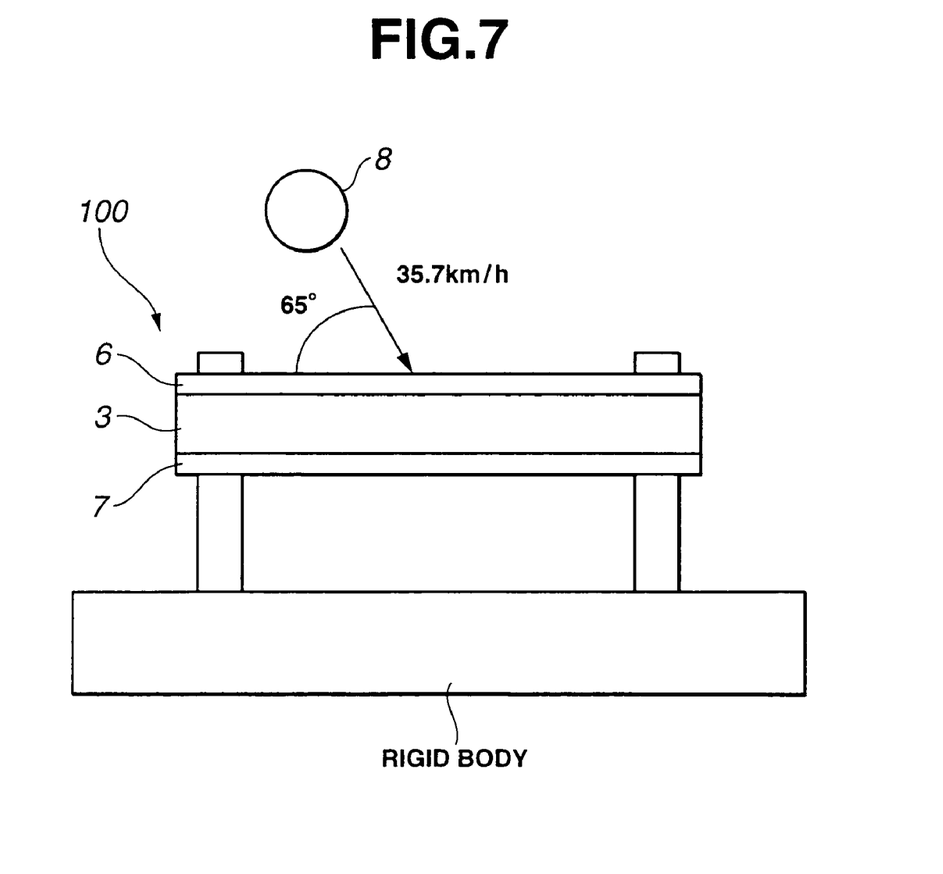
FIG. 7 is an explanatory diagram showing a test for determining an impact absorbing characteristic and a maximum displacement characteristic of the engine hood structure.
Figure 8:
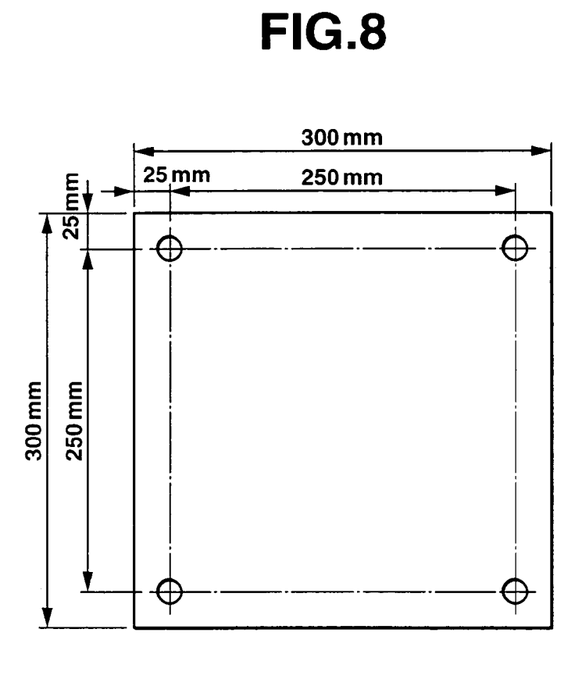
FIG. 8 is a diagram illustrating a schematic profile of a test piece used in the test shown in FIG. 7.
Figure 9:
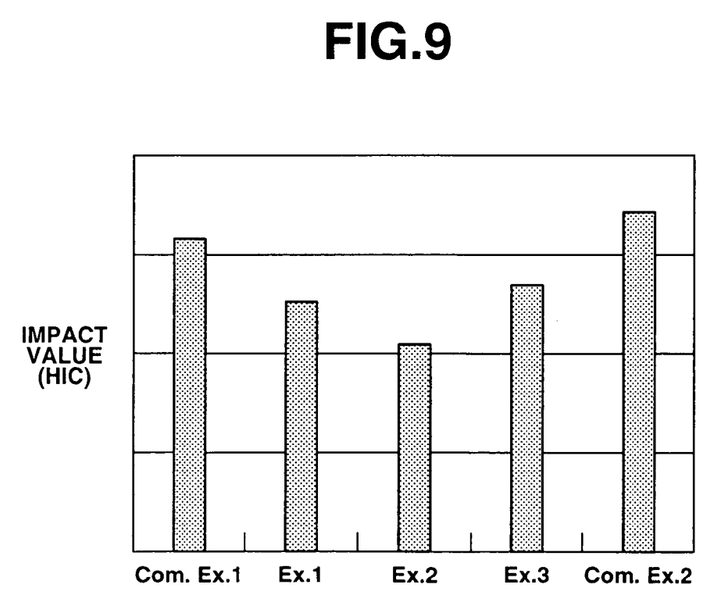
FIG. 9 is a graph showing impact values of the test pieces made of steel plates as used in respective Examples and Comparative Examples, which were determined by the test shown in FIG. 7.
Figure 10:
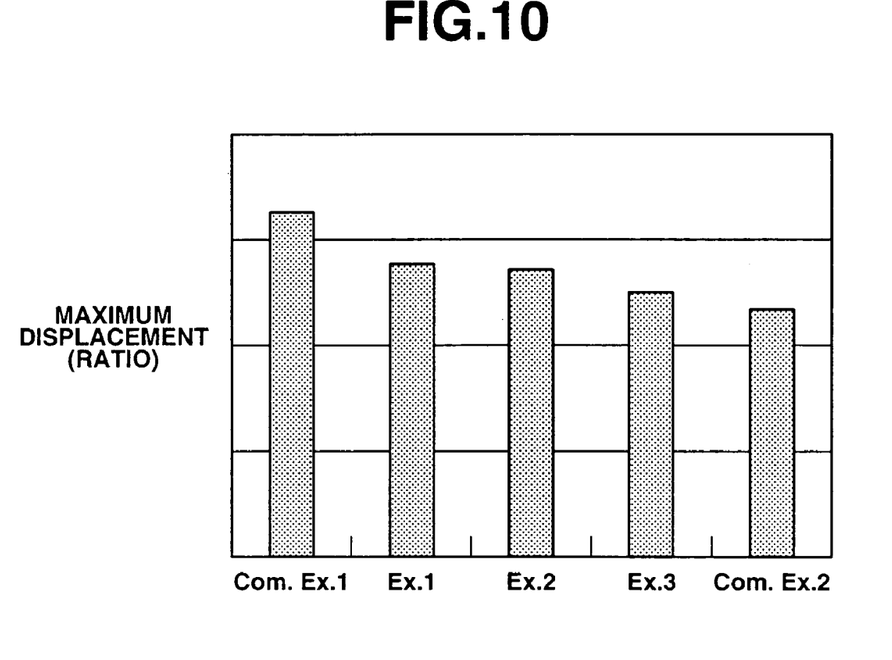
FIG. 10 is a graph showing maximum displacement ratios of the test pieces made of steel plates as used in respective Examples and Comparative Examples, which were determined by the test shown in FIG. 7.
Figure 11:
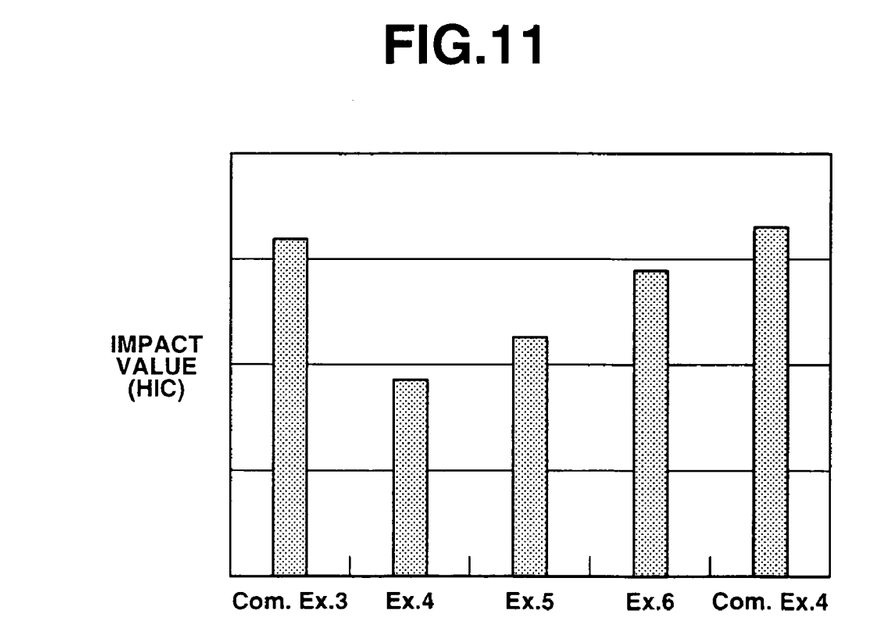
FIG. 11 is a graph showing impact values of the test pieces made of aluminum plates as used in respective Examples and Comparative Examples, which were determined by the test shown in FIG. 7.
Figure 12:
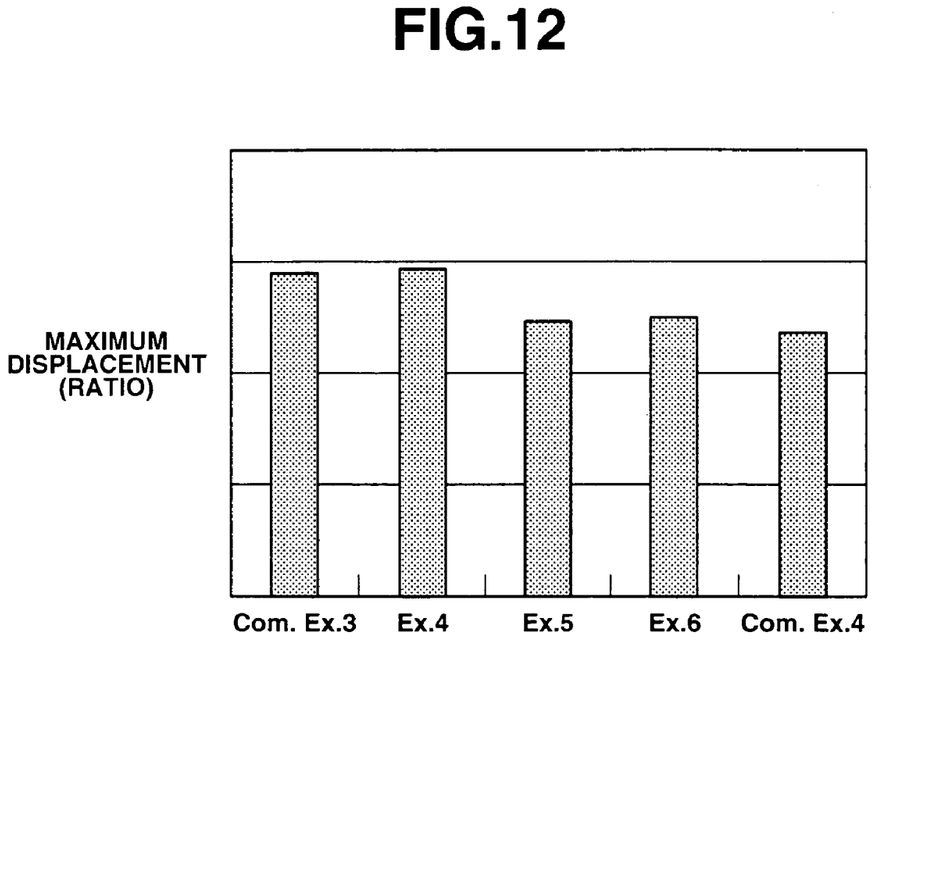
FIG. 12 is a graph showing maximum displacement ratios of the test pieces made of aluminum plates as used in respective Examples and Comparative Examples, which were determined by the test shown in FIG. 7.

Impact absorbing characteristic test: FIG. 7 schematically illustrates an impact absorbing characteristic test. FIG. 8 schematically illustrates a shape of test pieces. In Examples 1-6 and Comparative Examples 2 and 4, a hood outer panel, a hood inner panel and a porous metal layer were prepared under conditions shown in Tables 1 and 2 and formed into a test piece having the shape shown in FIG. 8. The porous metal layer was made of an aluminum foam and had a thickness of 10 mm. As shown in Tables 1 and 2, in Examples 1-6, a density of the porous metal layer and a plateau stress were within the above-described specific ranges according to the present invention. Thus, test pieces 100 having hood outer panel 6, hood inner panel 7 and porous metal layer 3 interposed therebetween as shown in FIG. 7 were prepared. In Comparative Examples 1 and 3, test pieces were prepared in the same manner as explained in Examples 1-6 and Comparative Examples 2 and 4, except that no porous metal layer was disposed between the hood outer panel and the hood inner panel.

TABLE 1

|  | Hood outer panel | Hood inner panel | Density of aluminum foam (g/cm$^3$) | Plateau stress (MPa) |
| --- | --- | --- | --- | --- |
| Comparative Example 1 | Steel plate 0.6 mm | Steel plate 0.6 mm | None | None |
| Example 1 | Steel plate 0.6 mm | Steel plate 0.6 mm | 0.15 | 2.5 |
| Example 2 | Steel plate 0.6 mm | Steel plate 0.6 mm | 0.30 | 6.0 |
| Example 3 | Steel plate 0.6 mm | Steel plate 0.6 mm | 0.58 | 16.0 |
| Comparative Example 2 | Steel plate 0.6 mm | Steel plate 0.6 mm | 0.95 | 20.5 |

TABLE 2

|  | Hood outer panel | Hood inner panel | Density of aluminum foam (g/cm$^3$) | Plateau stress (MPa) |
| --- | --- | --- | --- | --- |
| Comparative Example 3 | Aluminum plate 0.6 mm | Aluminum plate 0.6 mm | None | None |
| Example 4 | Aluminum plate 0.6 mm | Aluminum plate 0.6 mm | 0.15 | 2.5 |
| Example 5 | Aluminum plate 0.6 mm | Aluminum plate 0.6 mm | 0.30 | 6.0 |
| Example 6 | Aluminum plate 0.6 mm | Aluminum plate 0.6 mm | 0.58 | 16.0 |
| Comparative Example 4 | Aluminum plate 0.6 mm | Aluminum plate 0.6 mm | 0.95 | 20.5 |

The test pieces prepared in Comparative Examples 1 and 3, Examples 1-6 and Comparative Examples 2 and 4 were then subjected to an impact absorbing characteristic test to determine influences of a density of aluminum foam and a plateau stress generated upon a compression test, on an impact absorbing characteristic of the test pieces. The impact absorbing characteristic test was carried out as illustrated in FIG. 7. Test piece 100 was set on a rigid body, and head impactor 8 with an acceleration pickup was impacted against test piece 100 at a speed of 35.7 km/hr. An impact value applied to the test pieces and a maximum displacement amount thereof were measured. FIGS. 9-12 show the test results obtained by comparison between Comparative Examples 1 and 3, and Examples 1-6 and Comparative Examples 2 and 4.

It was found from the test results shown in FIGS. 9-12 that the impact values applied to the test pieces of Examples 1-6 and the maximum displacement thereof were reduced as compared to those of the test pieces of Comparative Examples 1 and 3.

Figure 13:
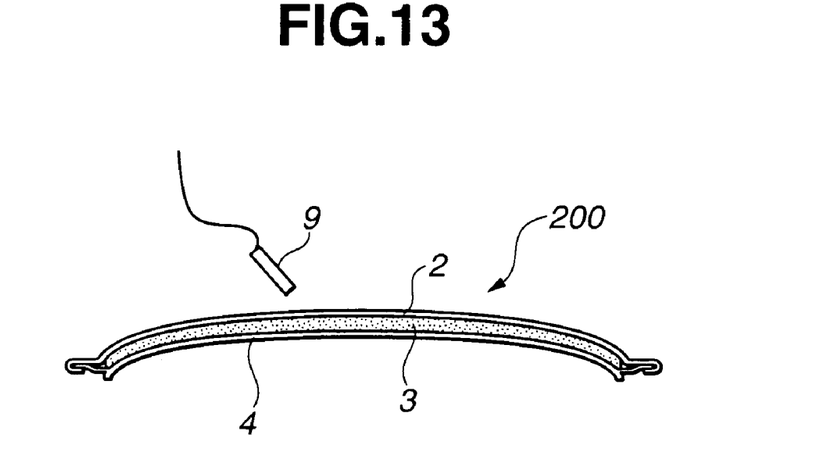
FIG. 13 is an explanatory diagram showing a test for determining a sound absorbing characteristic of the engine hood structure of the present invention.

Sound absorbing characteristic test: FIG. 13 schematically illustrates a sound absorbing characteristic test. A test piece of engine hood structure 200 was prepared, which had substantially the same construction as engine hood structure 30 of the third embodiment as shown in FIG. 4. Engine hood structure 200 was composed of hood outer panel 2 and hood inner panel 4 made of the same material as explained in the third embodiment, and porous metal layer 3 made of porous aluminum having an open cell structure. Thus-prepared engine hood structure 200 was mounted to a vehicle and subjected to the sound absorbing characteristic test as follows. The vehicle having an engine with a sound insulation cover was driven on a chassis dynamometer. Microphone 9 was set above engine hood structure 200 to measure variation in noise level. Table 3 shows the measurement results summarized in each frequency range, together with results evaluated by comparison with the conventional engine hood structure.

TABLE 3

|  | Frequency (Hz) | | | | | | |
| --- | --- | --- | --- | --- | --- | --- | --- |
|  | 100-200 | 200-400 | 400-600 | 600-800 | 800-1000 | 1000-1200 | 1200-1400 |
| Evaluation | B | C | B | B | A | A | A |

Notes:
A: excellent,
B: good,
C: equivalent,
D: deteriorated

It was found from the test results shown in Table 3 that as compared to the conventional engine hood structure, engine hood structure 200 of the present invention exhibited the good sound absorbing characteristic in the frequency range of 100-200 Hz and 400-800 Hz and the excellent sound absorbing characteristic in the frequency range of 800-1400 Hz.

As understood from the above description, with the arrangement of a porous metal layer, the engine hood structure according to the present invention can keep a uniform rigidity, reduce an engine noise, and effectively absorb an impact applied thereto from the outside.

This application is based on prior Japanese Patent Application No. 2004-085058 filed on Mar. 23, 2004. The entire contents of the Japanese Patent Application No. 2004-085058 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An engine hood structure, comprising:
a hood panel; and
a porous metal layer disposed on an inside of the hood panel;
wherein the porous metal layer comprises cells having an average diameter of 2-4 mm.

2. An engine hood structure, comprising:
a hood panel; and
a porous metal layer disposed on an inside of the hood panel;
wherein the porous metal layer has a thickness of 2-40 mm.

3. An engine hood structure, comprising:
a hood panel; and
a porous metal layer disposed on an inside of the hood panel;
wherein the porous metal layer has a density increased in a direction extending from an outer periphery of the engine hood structure toward a central portion of the engine hood structure.

4. The engine hood structure as claimed in claim 3, wherein the density of the porous metal layer is continuously increased in the direction extending from an outer periphery of the engine hood structure toward a central portion of the engine hood structure.

5. The engine hood structure as claimed in claim 3, wherein the density of the porous metal layer is stepwise increased in the direction extending from an outer periphery of the engine hood structure toward a central portion of the engine hood structure.

6. The engine hood structure as claimed in claim 3, wherein the density of the porous metal layer has a maximum of 0.1-0.6 g/cm$^3$ at the central portion of the engine hood structure.

7. The engine hood structure as claimed in claim 3, wherein the porous metal layer is made of at least one material selected from the group consisting of aluminum foam and porous aluminum.

8. An engine hood structure, comprising:
a hood panel; and
a porous metal layer disposed on an inside of the hood panel;
wherein the porous metal layer comprises at least a portion opposed to an engine body, the portion of the porous metal layer having a density higher than a density of a remainder portion of the porous metal layer.

9. The engine hood structure as claimed in claim 8, wherein the density of the portion opposed to the engine body is 0.1-0.6 g/cm$^3$.

10. The engine hood structure as claimed in claim 8, wherein the porous metal layer is made of at least one material selected from the group consisting of aluminum foam and porous aluminum.

11. The engine hood structure as claimed in claim 10, wherein the porous metal layer is made of aluminum foam.

12. An engine hood structure, comprising:
a hood panel; and
a porous metal layer disposed on an inside of the hood panel;
wherein the porous metal layer is constructed such that a plateau stress generated in the porous metal layer upon a compression test is increased in a direction extending from an outer periphery of the engine hood structure toward a central portion of the engine hood structure.

13. The engine hood structure as claimed in claim 12, wherein the plateau stress generated in the porous metal layer is continuously increased in the direction extending from an outer periphery of the engine hood structure toward a central portion of the engine hood structure.

14. The engine hood structure as claimed in claim 12, wherein the plateau stress generated in the porous metal layer is stepwise increased in the direction extending from an outer periphery of the engine hood structure toward a central portion of the engine hood structure.

15. The engine hood structure as claimed in claim 12, wherein the plateau stress generated in the porous metal layer has a maximum of 1-20 MPa at the central portion of the engine hood structure.

16. An engine hood structure, comprising:
a hood panel; and
a porous metal layer disposed on an inside of the hood panel;
wherein the porous metal layer comprises at least a portion opposed to an engine body, wherein a plateau stress generated in the portion of the porous metal layer upon a compression test is higher than a plateau stress generated in a remainder portion of the porous metal layer upon the compression test.

17. The engine hood structure as claimed in claim 16, wherein the plateau stress generated in the portion opposed to the engine body is 1-20 MPa.

18. An engine hood structure, comprising:
a hood outer panel;
a hood inner panel disposed on an inner surface of the hood outer panel; and
a porous metal layer disposed between the hood outer panel and the hood inner panel,
wherein the porous metal layer comprises cells having an average diameter of 2-4 mm.

19. An engine hood structure, comprising:
a hood outer panel;
a hood inner panel disposed on an inner surface of the hood outer panel; and
a porous metal layer disposed between the hood outer panel and the hood inner panel, wherein the porous metal layer has a thickness of 2-40 mm.

20. An engine hood structure, comprising:
a hood outer panel;
a hood inner panel disposed on an inner surface of the hood outer panel; and a porous metal layer disposed between the hood outer panel and the hood inner panel, wherein the porous metal layer has a density increased in a direction extending from an outer periphery of the engine hood structure toward a central portion of the engine hood structure.

21. An engine hood structure as claimed in claim 20, wherein the porous metal layer is made of at least one material selected from the group consisting of aluminum foam and porous aluminum.

22. An engine hood structure as claimed in claim 20, wherein the density of the porous metal layer is continuously increased in the direction extending from an outer periphery of the engine hood structure toward a central portion of the engine hood structure.

23. An engine hood structure as claimed in claim 20, wherein the density of the porous metal layer is stepwise increased in the direction extending from an outer periphery of the engine hood structure toward a central portion of the engine hood structure.

24. An engine hood structure as claimed in claim 20, wherein the density of the porous metal layer has a maximum of 0.1-0.6 g/cm$^3$ at the central portion of the engine hood structure.

25. An engine hood structure, comprising:
a hood outer panel;
a hood inner panel disposed on an inner surface of the hood outer panel; and
a porous metal layer disposed between the hood outer panel and the hood inner panel,
wherein the porous metal layer comprises at least a portion opposed to an engine body, the portion of the porous metal layer having a density higher than a density of a remainder portion of the porous metal layer.

26. An engine hood structure as claimed in claim 25, wherein the porous metal layer is made of at least one material selected from the group consisting of aluminum foam and porous aluminum.

27. An engine hood structure as claimed in claim 25, wherein the density of the portion opposed to the engine body is 0.1-0.6 g/cm$^3$.

28. An engine hood structure, comprising:
a hood outer panel;
a hood inner panel disposed on an inner surface of the hood outer panel; and
a porous metal layer disposed between the hood outer panel and the hood inner panel,
wherein the porous metal layer is constructed such that a plateau stress generated in the porous metal layer upon a compression test is increased in a direction extending from an outer periphery of the engine hood structure toward a central portion of the engine hood structure.

29. An engine hood structure as claimed in claim 28, wherein the plateau stress generated in the porous metal layer is continuously increased in the direction extending from an outer periphery of the engine hood structure toward a central portion of the engine hood structure.

30. An engine hood structure as claimed in claim 28, wherein the plateau stress generated in the porous metal layer is stepwise increased in the direction extending from an outer periphery of the engine hood structure toward a central portion of the engine hood structure.

31. An engine hood structure as claimed in claim 28, wherein the plateau stress generated in the porous metal layer has a maximum of 1-20 MPa at the central portion of the engine hood structure.

32. An engine hood structure, comprising:
a hood outer panel;
a hood inner panel disposed on an inner surface of the hood outer panel; and
a porous metal layer disposed between the hood outer panel and the hood inner panel,
wherein the porous metal layer comprises at least a portion opposed to an engine body, a plateau stress generated in the portion of the porous metal layer upon a compression test is higher than a plateau stress generated in a remainder portion of the porous metal layer upon the compression test.

33. An engine hood structure as claimed in claim 32, wherein the plateau stress generated in the portion opposed to the engine body is 1-20 MPa.

* * * * *